F. WOLFRAM, OF NEW YORK, N. Y.

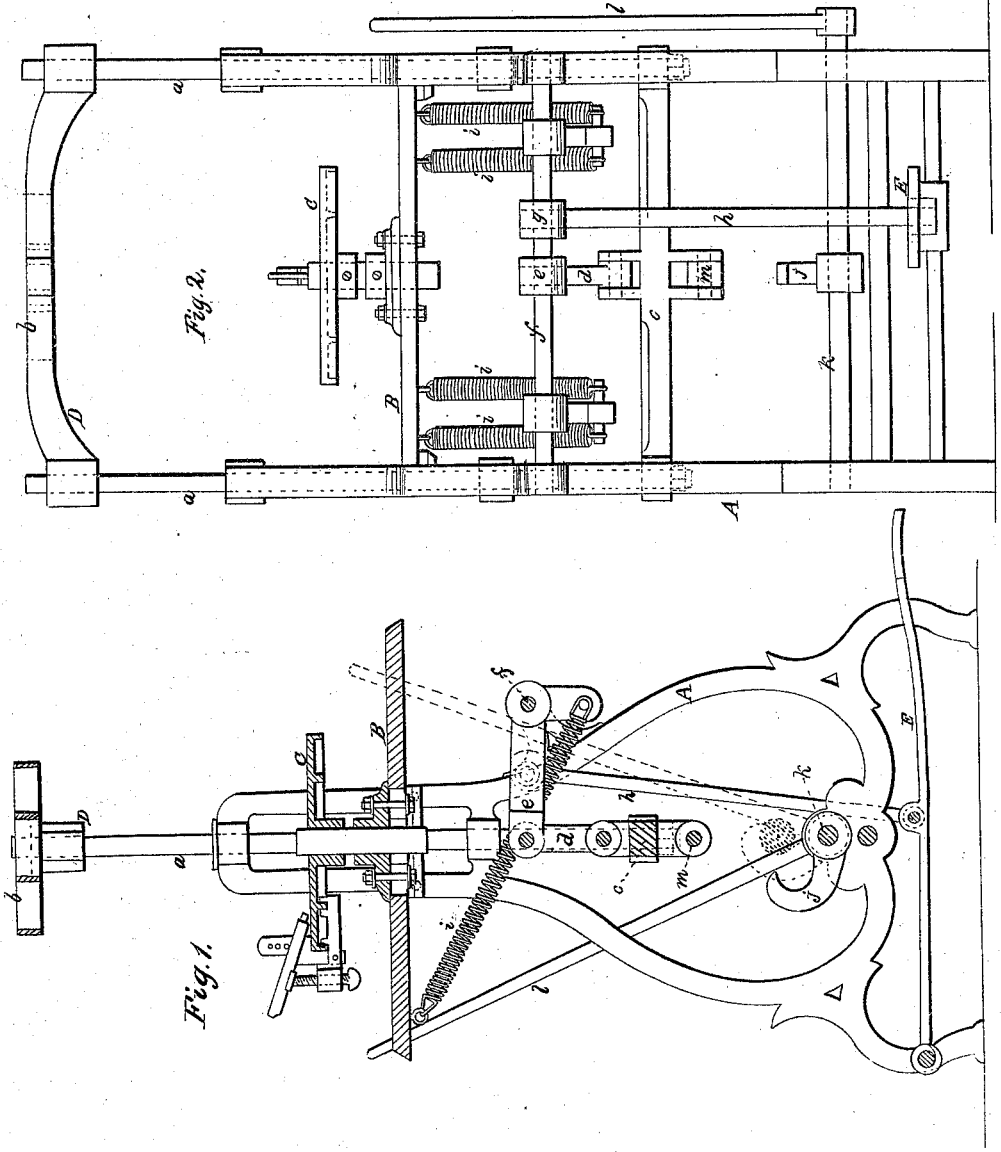

Letters Patent No. 87,744, dated March 9, 1869.

IMPROVEMENT IN MACHINES FOR PRESSING HATS.

The Schedule referred to in these Letters Patent and making part of the same.

*To all whom it may concern:*

Be it known that I, F. WOLFRAM, of the city, county, and State of New York, have invented a new and improved Machine for Pressing Hats and other articles; and I do hereby declare the following to be a full, clear, and exact description thereof, which will enable those skilled in the art to make and use the same, reference being had to the accompanying drawing, forming part of this specification, in which drawing—

Figure 1 represents a longitudinal vertical section of this invention.

Figure 2 is a rear elevation thereof.

Similar letters indicate corresponding parts.

This invention consists in the arrangement of a lever and dog, in combination with the gate which carries the follower of the press, and which is depressed by a foot-lever, in such a manner that an additional and final pressure can be brought to bear thereon by the lever and dog; and furthermore, by said dog the follower is locked down, and thereby the operator is enabled to release the foot-lever without permitting the follower to rise.

A represents a frame, made of cast-iron, or any other suitable material.

To this frame is firmly secured the platform B, which serves to support the male die or form in pressing hats, or any corresponding portion of the die, in pressing other articles.

For the sake of greater convenience in operating the press, the male die or form may be secured to an additional raised face-plate C, which is firmly attached to the platform B.

The side pieces of the frame A form the guides for two rods, $a$, which are connected at the top by a bridge-piece, $b$, and at their bottom ends by a cross-bar, $c$, so that said rods, together with the bridge-piece and cross-bar, form a gate, D, which can be raised or lowered at pleasure.

To the bridge-piece $b$ is secured the female die or follower, in such a position that when the gate D is depressed, said follower will match with the male die or form attached to the platform B.

The bottom cross-bar, $c$, of the gate connects, by a link, $d$, and lever, $e$, with a rock-shaft, $f$, which has its bearings in suitable brackets or arms of the frame A, and which connects, by an arm, $g$, and pitman, $h$, with a foot-lever, E, so that by stepping on said foot-lever, the gate D, together with the follower attached thereto, can be depressed, and the operation of pressing a hat or other article can be effected.

Suitable springs, $i$, which act on the rock-shaft $f$, serve to raise the gate and follower as soon as the foot-lever is released.

When the follower has been depressed by the foot-lever to its utmost extent, it is desirable to exert an additional pressure thereon, so as to bring the article to be pressed to the required shape; and furthermore, it is also desirable to lock down the gate D, so that the operator is enabled to remove his foot from the lever E without allowing the follower to recede.

This object is effected by a dog, $j$, which is secured to a rock-shaft, $k$, to which an oscillating motion can be imparted by a lever, $l$.

When the gate D has been depressed by the foot-lever E, the dog $j$ can be brought to bear on a roller-stud, $m$, secured between two lugs projecting from the lower side of the cross-piece $c$, and by compelling the dog to catch over this roller-stud, a final pressure is produced on the article to be pressed, and the gate D is locked down by the dog.

If this dog is not used, the operator has to hold down the foot-lever E, by exerting his whole power, until the article to be pressed has assumed the required shape, but by the action of the dog and lever $l$, he is enabled to produce a powerful final pressure, and to retain the article to be pressed in its compressed state for any desired period, without additional exertion.

Having thus described my invention,

What I claim as new, and desire to secure by Letters Patent, is—

The dog $j$ and lever $l$, in combination with the gate D, which carries the follower of a press, substantially as and for the purpose set forth.

F. WOLFRAM.

Witnesses:
    W. HAUFF,
    ERNEST F. KASTENHUBER.